(No Model.)  2 Sheets—Sheet 1.

M. DORAN.
BAND CUTTER AND FEEDER FOR THRASHING MACHINES.

No. 341,375.  Patented May 4, 1886.

WITNESSES:
Thos. Houghton.
John C. Kemon

INVENTOR:
Michael Doran
BY Munn & Co
ATTORNEYS.

(No Model.) 2 Sheets—Sheet 2.

M. DORAN.
BAND CUTTER AND FEEDER FOR THRASHING MACHINES.

No. 341,375. Patented May 4, 1886.

WITNESSES:
Thos Houghton
John C. Kernon

INVENTOR:
Michael Doran
BY Munn & Co
ATTORNEYS.

N. PETERS, Photo-Lithographer, Washington, D. C.

UNITED STATES PATENT OFFICE.

MICHAEL DORAN, OF BERGEN, NEW YORK.

BAND-CUTTER AND FEEDER FOR THRASHING-MACHINES.

SPECIFICATION forming part of Letters Patent No. 341,375, dated May 4, 1886.

Application filed July 6, 1885. Serial No. 170,795. (No model.)

*To all whom it may concern:*

Be it known that I, MICHAEL DORAN, a citizen of the United States, residing in Bergen, county of Genesee, and State of New York, have invented a certain new and useful Improvement in Band-Cutters and Feeders for Thrashing-Machines; and I do hereby declare that the following is a full, clear, and exact description thereof, reference being had to the accompanying drawings.

This invention relates to an improvement in band-cutters and feeders for thrashing-machines.

The invention consists in certain novel constructions and combinations of parts, as will be hereinafter first fully described, and then pointed out in the claims.

Figure 1:
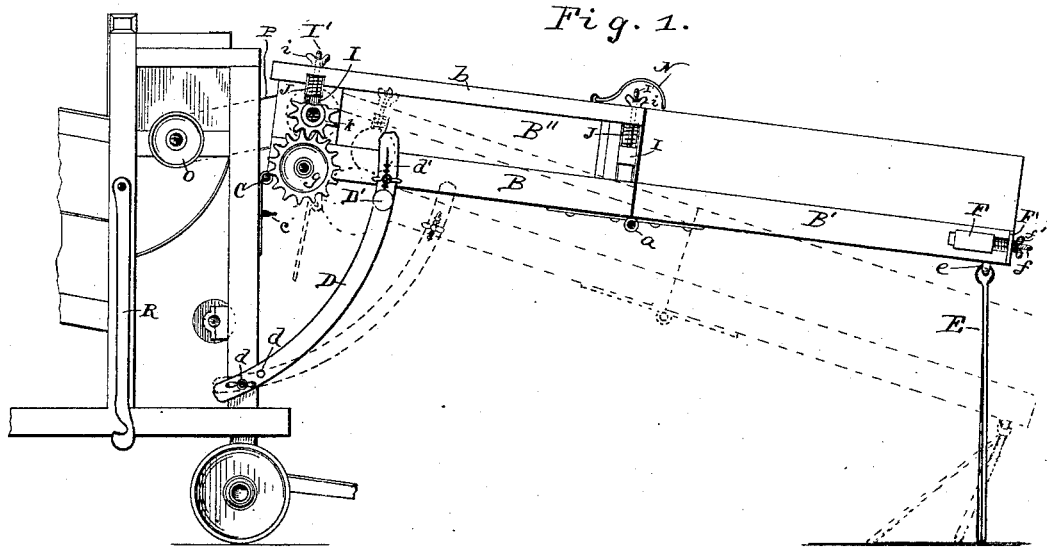
Figure 2:
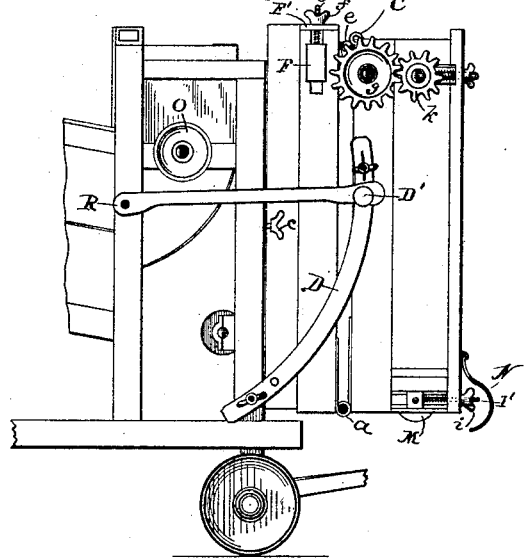
Figure 5:
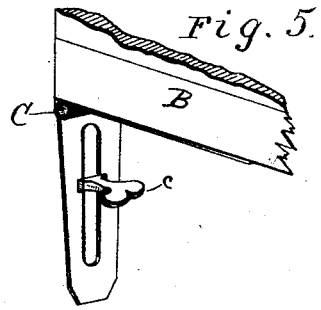
Figure 3:
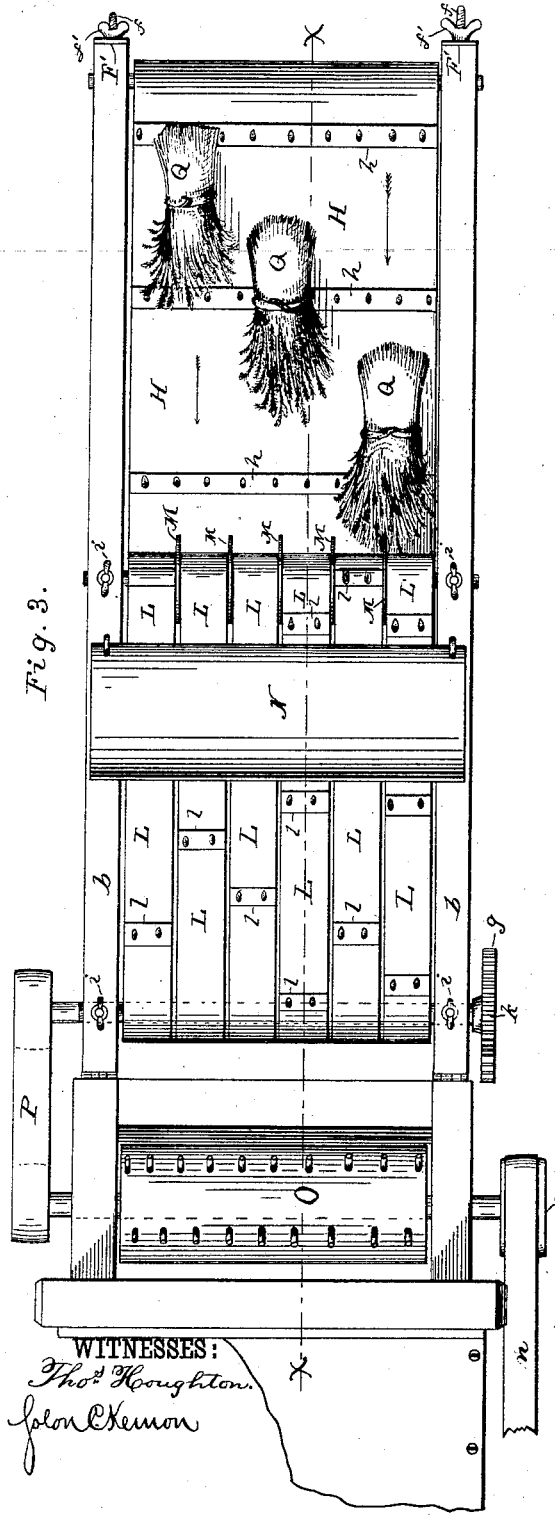
Figure 4:
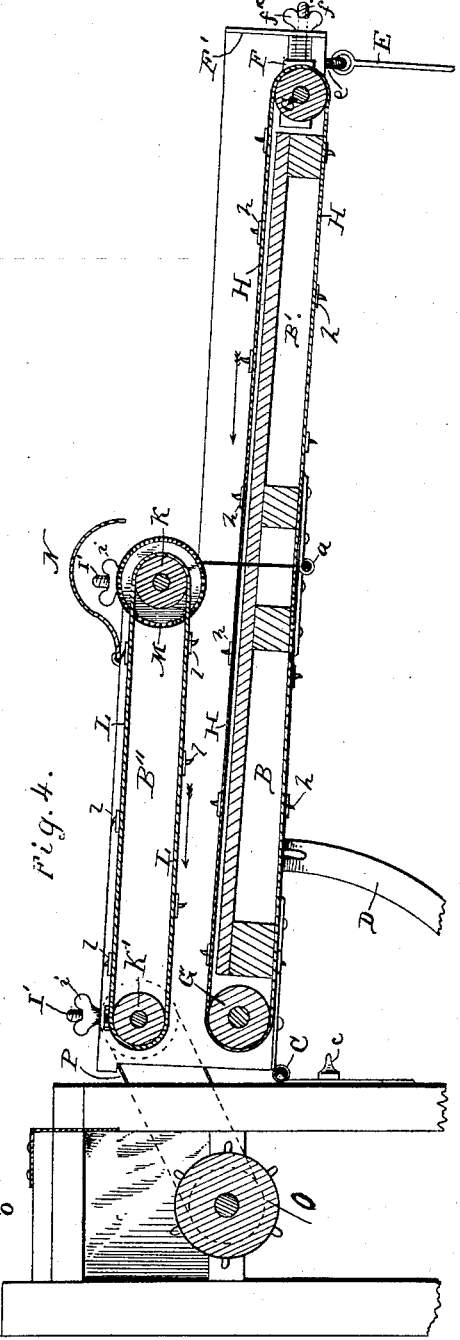

Figure 1 is a side elevation of the attachment connected to the forward end of a thrashing-machine, the rear portion of which is broken away. Fig. 2 is a similar view showing the attachment in a folded position. Fig. 3 is a plan view of the attachment. Fig. 4 is a longitudinal section on the line $x$ $x$ of Fig. 3; and Fig. 5 is a detail view representing the hinge connection of the attachment with the thrasher-frame.

The feeder-frame is made in two sections, B B', hinged together on their under side by the strap-hinge $a$, so that when the frame is in position the adjacent edges of the sections B and B' will abut against and mutually brace each other. The forward end of the frame is connected to the forward end of the thrashing-machine by strap-hinges, one part of each of which is secured to the feeder-frame, the other parts being slotted and held between the shoulders or heads of set-screws $c$ and the frame of the thrasher. Curved arms D, having a series of apertures, $d$, at their lower ends for adjustably connecting the same to the thrasher by means of set-screws, and elongated openings at their upper ends, having notches or serrations $d'$ on either side thereof, for adjustably securing them to the feeder-frame by suitable set-screws, serve to brace the feeder-frame when unfolded and as a support for the same when folded. Rods E, having eyelets formed at their upper ends, are connected by suitable staples, $e$, to the outer or rear end of the feeder-frame, and form a support for the same. The rear ends of the sills or sides of the section B' are slotted, and boxes F, seated within said slots, are adjusted by suitable threaded rods $f$, connected therewith and passing through plates F' on the rear ends of the sills and engaging thumb-nuts $f'$. A roller, G, is journaled within the boxes, and an endless carrier, H, provided with toothed bars $h$, passes over the same and around and over a corresponding roller, G', journaled in the forward end of the section B of the feeder-frame. The sides of the section B are provided with a vertical extension, B'', the opposite ends of which are vertically slotted to receive bearing blocks I, provided with threaded rods I', which latter pass through openings in the crown-pieces $b$ and engage thumb-nuts $i$, which limit the downward movement of the blocks. Coil-springs J are placed on the threaded rods I', and bear between the upper sides of the blocks and the under sides of the pieces $b$. Around the rollers K and K', which are journaled in the blocks I, pass a series of endless carrier-straps, L, provided with teeth $l$. Keyed to the roller K and working between the endless carriers L, is a series of circular cutter-disks, M. The guard N is hinged to the upper edge of the extension B'', so that it may be folded back to gain access to the cutters M, as shown in Fig. 3.

In practice, motion being communicated to the thrashing-cylinder O from any suitable source of power by means of the belt $n$, passing over the pulley $o$ on one end of the cylinder-shaft, the same will be transmitted from the thrashing-cylinder to one of the rollers on the feeder-frame—which, in the present instance, is preferably the roller K'—by a belt, P, passing over pulleys on the ends of their shafts, or by any suitable intermediate gearing. A gear-wheel, $g$, on the end of the roller-shaft G', meshing with a pinion, $k$, on the end of the roller-shaft K', imparts a movement thereto. As the relative speeds of the two rollers G K' and the carriers H L depend on the diameters of the pinion $k$ and the gear-wheel $g$, the latter may be proportioned to give any desired relative rate of speed to said carriers. In the present instance the proportion is two to one.

The machine having been set in motion, as described, sheaves of grain Q, placed on the endless carrier H, will be advanced to the cutters M, one of which will sever the band. That portion of the grain coming in contact with the carriers L, which travel at a higher rate of speed, will be carried forward faster than that portion of the grain not in immediate contact with the said carriers L. The sheaf, when it first contacts with the conveyers L, owing to its bulk, will cause the same to rise against the tension of the springs J, and the latter will serve to force the carriers L to their work as the bulk of the sheaf is diminished.

To fold the attachment for transportation, the set-screws c are made to register with the slots in the hinges C, when, by an upward and outward movement of the feeder-frame, the hinge-connections C will be disconnected from the thrashing-machine, and the attachment will be free to turn on its pivotal connections with the arms D. Now, by folding the sections, the rods E being folded in between the two sections, and allowing the section B to turn on its pivotal connection with the upper ends of the arms D, the whole will assume the position shown in Fig. 2. Rods R, pivoted to the thrashing-machine, and provided with hooked ends to engage the studs D' of the arms D, hold the frame in its folded position.

The inclination of the attachment to the thrashing-machine may be easily adjusted by loosening the set-screw c, when the whole will turn on its pivotal connections with the arms D, the slotted hinge-connections C moving freely between the heads or shoulders of the set-screws c and the frame of the thrashing-machine.

Having thus described my invention, what I claim as new, and desire to secure by Letters Patent, is—

1. The combination of the thrasher-frame, the band-cutter and feeder, a support for the outer end of the band-cutter and feeder, hinges secured to such band-cutter and feeder, and having their lower straps lapped alongside of the thrasher-frame, and provided with longitudinal slots, and set-screws turned through such slots into the thrasher-frame, substantially as set forth.

2. A band-cutting and feeding attachment comprising inner section, B, a roller, G, and the side frames extended above said roller, the spreader-apron and its rollers supported in the upper extensions of such side frames, the section B', provided with a roller, G, and having its inner end hinged to the outer end of section B, and the carrier-apron, substantially as set forth.

3. The combination, with the thrasher-frame and the section B, of the arms D, provided with studs D', and having their inner ends connected with the thrasher-frame and their other ends to the section B, the section B', hinged to the outer end of and adjustable under the section B and between the same and the thrasher, and the hooks connected at one end with the thrasher-frame, and having their other ends engaged with studs D', substantially as set forth.

4. The combination, with the thrasher-frame, of the band-cutter and feeder, the hinges C, having their upper straps connected therewith and their lower straps formed with elongated slots, the screws c, passed through said slots into the thrasher-frame, and the arms D, having their opposite ends connected, respectively, with the thrasher-frame and band-cutter and feeder, substantially as set forth.

MICHAEL DORAN.

Witnesses:
SOLON C. KEMON,
CHAS. A. PETTIT.